May 31, 1960   J. H. DEBS   2,938,649
BAKING PAN ASSEMBLY
Filed Feb. 10, 1958
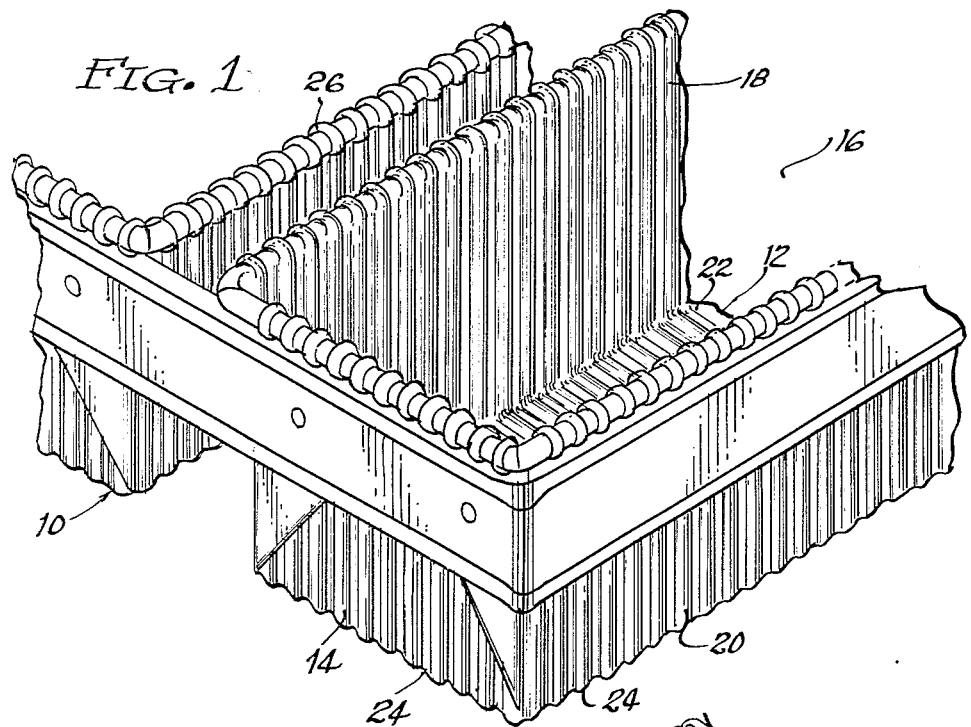
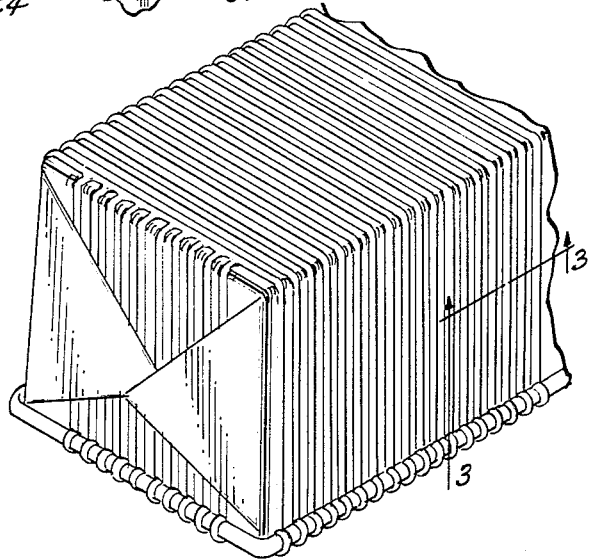
INVENTOR.
Jerome H. Debs
BY Dome, McDougall,
Williams & Hersh
Attorneys United States Patent Office 2,938,649
Patented May 31, 1960

2,938,649

BAKING PAN ASSEMBLY

Jerome H. Debs, Chicago, Ill., assignor to Chicago Metallic Manufacturing Co., Chicago, Ill., a corporation of Illinois Filed Feb. 10, 1958, Ser. No. 714,220

3 Claims. (Cl. 220—72)

This invention relates to a pan for baking bread and the like goods and it relates more particularly to a multiple baking pan assembly embodying baking pans of a new and novel construction strapped together for use in automatic baking ovens.

This invention is a continuation-in-part of the baking pan and baking pan assembly described and claimed in my co-pending application Serial No. 493,144, filed May 9, 1955, now Patent No. 2,834,505, and entitled "Baking Pan."

Baking pans of the type embodying features of this invention are formed generally of sheet metal such as tinplate, aluminum and the like, and are employed in baking either as separate units or as units in which a plurality of pans are joined together in an assembly for automatic handling in commercial bakeries and the like. Such pans are usually fabricated of metal sheet stock into units of rectangular shape having a bottom wall and rather steep and deep side and end walls extending upwardly substantially perpendicularly from the edges of the bottom wall.

Various difficulties have been experienced in the use of baking pans of the type described. One difficulty which has been encountered resides in the failure to release the baked goods from the pan. The release difficulties usually stem from adhesions which occur at the corner portions and portions adjacent the areas between the side walls of the pan and the baked goods. It is believed also that entrapped moisture turns to steam during the baking operation and that the steam breaks down the glaze on the pan. This causes the bread to stick and it necessitates reglazing the pan. When entrapment occurs either the baking process is interfered with or other factors develop which cause tears in the baked goods during removal from the pan. In automatic operations where removal is effected without individual regard for the conditions existing, the number of rejects because of tearing in the baked goods rises to undesirable proportions.

Further, the vapor or other volatiles released during the baking operation and entrapped between the baking pan walls and the goods baked therein occupies space otherwise filled with the baked material. As a result, voids are formed in the walls of the baked goods which represent blemishes in the finished product further to detract from its salability.

In addition, such sheet metal fabrications have been found to be rather weak in the edge portions and to be less capable of resisting distortion under conditions existing in normal use for baking bread and the like in commercial bakeries. Distortions and deformations in the walls of the pan provide for corresponding impressions to be formed in the goods baked therein. Thus, when such distortions and deformations become excessive, the products baked therein become unacceptable for sale resulting in waste of material and the necessity to remove the pan from service.

From the standpoint of operation, such distortions introduce obstacles in the path of the product baked in the pan to militate against removal of the baked goods in a single piece. Complications arise in the baking operation, an inferior product is produced and, ultimately, the pan must be removed from service. These complications lead to waste, to increase in the amount of labor required and ultimately to loss of the service of the pan in a relatively short time.

Thus, it is an object of this invention to produce and to provide a method of producing a baking pan formed of sheet metal for use in the preparation of baked goods and it is a related object to produce a pan of the type described in which the amount of adhesions and distortions are reduced to a minimum.

Another object is to produce a baking pan of the type described embodying means for the uniform distribution and escape of moisture from concealed portions of the pan, and it is a related object to provide a sheet metal pan of the type described which is capable of use to produce baked goods without the necessity for providing perforations in the walls of the pan for the escape of moisture or other volatiles or for use in forming a crust on the goods baked therein.

These and other objects and advantages of this invention will hereinafter appear, and for purposes of illustration, but not of limitation, an embodiment of the invention is shown in the accompanying drawings in which—

Fig. 1 is a perspective elevational view of the fragmentary portion of a multiple baking pan assembly embodying the features of this invention;

Fig. 2 is a perspective view from the bottom side of a baking pan embodying features of this invention, and Fig. 3 is a sectional view taken along the line 3—3 of Fig. 2.

In the aforementioned co-pending application, the objectionable features previously described are overcome to a limited extent by the fabrication of each baking pan with laterally spaced apart grooves formed in the bottom wall of the pan to extend continuously from a short distance inwardly from the edges of the bottom wall about the respective corners to a short distance upwardly into the side and end walls of the pan.

Thus, the critical relation and confinement bound to exist in the corner portions of the pan and the goods baked therein is somewhat relieved materially to reduce the amount of sticking and the number of blemishes in the goods baked therein without imposing undesirable effects on the construction and operation of the pan and the goods baked therein.

It has now been found that these improvements can be materially extended and that unexpected additional benefits are derived when, instead of terminating the grooves a short distance up from the corners of the side and end walls of the pan the grooves are continued upwardly throughout the said side and end walls and, preferably, about the rim that is formed over the bead while comprising the frame of the pan. While it is not essential to continue the grooves across the bottom wall of the pan, it is preferred to extend the grooves continuously across the bottom wall of the pan. The grooves can extend from the side walls continuously across the bottom wall of the pan other than in the areas occupied by the grooves extending inwardly from the end walls.

Referring now to the drawing, the baking pan is represented by the numeral 10. The baking pan is formed with a bottom wall 12 and with end walls 14 and 16, and with side walls 18 and 20 which extend substantially perpendicularly upwardly from the end and side edges respectively of the bottom wall 12 and, preferably, at a slight outward taper from the bottom to top to provide a clearance for easing the release of the baked goods from the pan.

The difficulties heretofore encountered in a deep dished pan of the type described for baking loaves of bread and the like have been alleviated by the formation of the pan with laterally spaced apart grooves or corrugations 22 in the bottom wall of the pan extending continuously from a distance inwardly of the edge about the corner 24 into and throughout the length of the connecting side and end walls of the pan to the upper edge 26. The grooves should extend into the bottom wall for a distance greater than one-half inch but it is preferred to have the grooves extend continuously across the entire width thereof.

The grooves or corrugations are spaced apart a distance preferably substantially twice the width of the corrugations, and the depth of the grooves is preferably formed to correspond to the thickness of the metal walls forming the pan, as a minimum. Preferably, the grooves are formed of a continuous V pattern with rounded corners, as illustrated in Figure 3. It will be understood that the spaced relation between the corrugations or grooves and the depth of the grooves may be varied, but it is preferred to form the grooves and corrugations with a curvilinear contour with the ends tapering gradually into the side walls and the bottom walls or end walls of the pan.

Under the conditions described, it has been found that, during the baking operation, the material being baked tends to draw away slightly from the outwardly extending grooves or corrugations thereby to provide channels communicating the underside of the baked goods with the outside atmosphere through which vapor in the form of moisture or other volatiles can be vented for more rapid and complete escape into the atmosphere.

The corrugations which provide channels extending substantially throughout the lengths of the side and end walls of the pan will become effective still further to provide the conditions which have heretofore required the formation of perforations throughout the walls of the pan. Thus, a baking pan is capable of being constructed having considerably greater strength not only from the standpoint of the corrugations which are embodied in the pan but from the standpoint of support of a continuous wall as distinguished from a highly perforated wall of the type heretofore required to produce a crusted bread. Similarly the corrugations taken on by the walls of the goods baked therein will not only enhance the appearance of the baked goods but more crust will be made available and the crust will be strengthened to minimize collapse of the baked goods.

Still further, the ribbing or fluting operates beneficially to increase the baking surface thereby to direct more heat to the baked goods. This results in the ability to bake the goods properly in shorter time.

It will be apparent further that the retraction of the baked goods from the corrugations in the side and end walls of the pan will minimize the area of contact between the baked goods and the walls of the pan thereby materially to reduce the areas of possible adhesions between the baked goods and the pan walls so as to remit the preparation of baked goods having a glaze on the surface thereof.

The ability to provide for an immediate release of baking gases from the assembly further minimizes the amount of distortions in the goods by reason of entrapment of the gases, and it has been found to be effective to increase the life of the pan and the number of bakes per glaze in the pan. The channels extending continuously throughout the walls of the pan provide for better glazed releases aside from the fact that the area of contact between the baked goods and the pan is markedly reduced.

The development of channels extending continuously throughout the lengths of the walls in closely spaced apart parallel relation eliminates the need for pierced holes while at the same time provides for a more uniform baked crust on the outer walls of the baked goods.

It will be apparent from the foregoing that numerous advantages are available from the modification in pan construction described and that changes may be made with respect to the extent of corrugations and the arrangement of corrugations in the pan in that the corrugations may extend angularly through the walls of the pan in parallel and in criss-cross relationship, and in that the corrugations extend upwardly throughout the end and side walls of the pan to a point short of the upper edge of the pan but beyond the level of the goods intended to be baked therein.

It will be understood that other changes may be made in the details of construction, arrangement and operation without departing from the spirit of the invention, especially as defined in the following claims.

I claim:

1. In a baking pan having a flat, horizontally disposed bottom wall and deep side and end walls extending upwardly substantially perpendicularly from the outer edges of the bottom wall to the upper edges of the pan, the improvement which comprises linear grooves in closely spaced apart parallel relation in the pan extending continuously from the side corner portions inwardly across the bottom wall of the pan and up the respective side walls of the pan to the upper edge portions thereof, said grooves being dimensioned to have a narrow width to cause retraction of the dough therefrom during the baking operation thereby to provide continuous, closely spaced panels along the interior bottom and side walls of the baking pan extending continuously across the bottom wall and up the side walls to enable baking vapors and gases to escape during the baking operation.

2. A baking pan as claimed in claim 1 in which the grooves are spaced apart one from the other by a distance of about twice the width of the grooves.

3. In a baking pan having a flat, horizontally disposed bottom wall and deep side and end walls extending upwardly substantially perpendicularly from the outer edges of the bottom wall to the upper edges of the pan, the improvement which comprises linear grooves in closely spaced apart parallel relation in the pan extending continuously from the side corner portions inwardly across the bottom wall of the pan and up the respective side walls of the pan to the upper edge portion thereof and similar grooves in similarly spaced apart parallel relation in the end walls of the pan extending continuously from the end corners of the pan upwardly to the upper edge portion thereof, said grooves being dimensioned to have a narrow width to cause retraction of the dough therefrom during the baking operation thereby to provide continuous, closely spaced panels along the interior walls of the baking pan extending continuously across the bottom wall and up the side and end walls to enable baking vapors and gases to escape during the baking operation.

References Cited in the file of this patent

UNITED STATES PATENTS

| Number | Name | Date |
|---|---|---|
| 476,340 | Wagandt | June 7, 1892 |
| 2,358,457 | Jackson | Sept. 19, 1944 |
| 2,802,411 | Riener | Aug. 13, 1957 |
| 2,834,505 | Debs | May 13, 1958 |

FOREIGN PATENTS

| 671,933 | Great Britain | May 14, 1952 |